C. M. BACKMAN.
SPRING WHEEL.
APPLICATION FILED JULY 13, 1910.
981,831.
Patented Jan. 17, 1911.
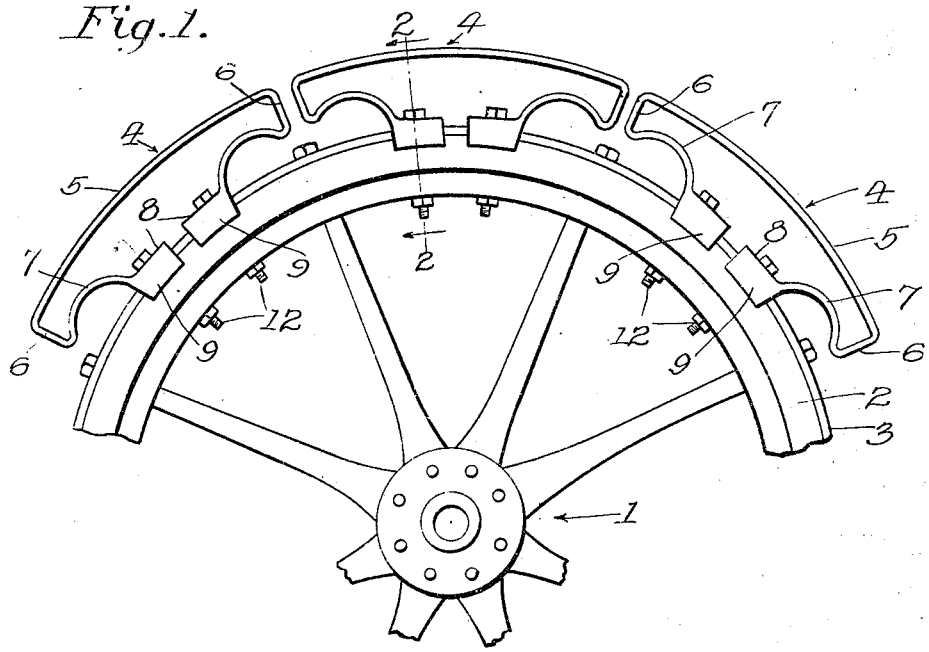
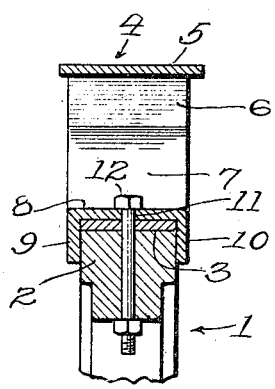
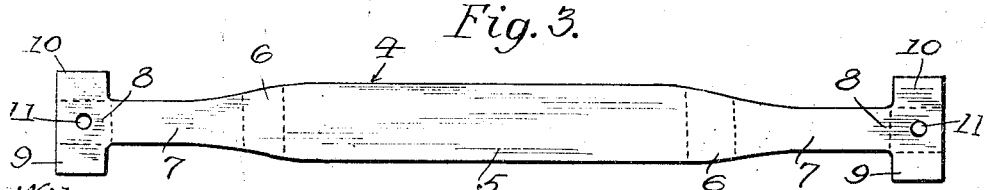
Witnesses:
C. J. Williams
Florence Williams
Inventor,
Charles M. Backman
Simer G. Wells,
Attorney.

UNITED STATES PATENT OFFICE.

CHARLES M. BACKMAN, OF LOS ANGELES COUNTY, CALIFORNIA.

SPRING-WHEEL.

981,831.

Specification of Letters Patent. Patented Jan. 17, 1911.

Application filed July 13, 1910. Serial No. 571,693.

*To all whom it may concern:*

Be it known that I, CHARLES M. BACKMAN, a citizen of the United States, residing in Los Angeles county, California, have invented a new and useful Spring-Wheel, of which the following is a specification.

An object of my invention is to provide a spring attachment for vehicle wheels which will take the place of pneumatic tires and the like.

Referring to the drawings: Figure 1 is a fragmental side elevation of a vehicle wheel provided with my spring attachment. Fig. 2 is a sectional detail on the line 2—2 of Fig. 1. Fig. 3 is a view of the device as it appears when stamped from a sheet of steel.

Referring more in detail to the drawings 1 indicates a vehicle wheel provided with the ordinary felly 2 and a rim 3. Mounted upon the outside circumference of the felly 2 and equidistant from each other are a series of spring buffers or cushions 4, said spring buffers 4 consisting of a tread portion 5, concentric with the outer circumference of the felly 2, the end portions 6 being bent downwardly toward the axis of the wheel, thence curved upwardly and inwardly to form the spring portions 7, the flattened portions 8 fitting upon the rim 3, said portions 8 having ears 9 and 10 bent downwardly around the felly 2 and said portions 8 also being provided with perforations 11 to receive bolts 12 which extend through the felly 2 and fasten the spring buffers 4 rigidly with the felly 2. The tread portion 5 of the spring buffer 4 is preferably wider in cross section than the downwardly bent portions 6, as shown in Figs. 2 and 3.

In Fig. 3, the dotted lines indicate where the blank is to be bent to form the spring buffer.

It is obvious that a wheel provided with a series of these resilient spring buffers will be as effective and can stand much more abuse than a pneumatic tire.

The details of construction may be varied in many ways without departing from the spirit of my invention. The essentials are: a rigid base rim; and a sectional yielding rim; each section comprising a central tread portion, return bends at the ends of the tread portion; and attaching clips embracing the base rim.

I claim:

In a spring wheel, a wood felly, an iron rim upon the wood felly, and a series of spring cushions, each of said spring cushions consisting of a tread portion concentric with the felly, end portions bent downwardly toward the axis of the wheel and then curved upwardly and inwardly to form springs, flattened portions extending inwardly from the ends of the springs and fitting upon the metal rim, bolts securing the flattened portions in place, and ears extending downwardly upon opposite sides of the metal rim against the sides of the felly.

CHARLES M. BACKMAN.

Witnesses:
 FLORENCE WILLIAMS,
 O. E. SMITH.